(12) United States Patent
Sakaguchi

(10) Patent No.: US 6,377,254 B1
(45) Date of Patent: Apr. 23, 2002

(54) INFORMATION INPUT/OUTPUT APPARATUS

(75) Inventor: Katsuhiko Sakaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/449,071

(22) Filed: May 24, 1995

Related U.S. Application Data

(63) Continuation of application No. 08/079,855, filed on Jun. 22, 1993, now abandoned, which is a continuation of application No. 07/668,118, filed on Mar. 12, 1991, now abandoned.

(30) Foreign Application Priority Data

Mar. 14, 1990 (JP) .............................................. 2-64976

(51) Int. Cl.[7] .............................................. G06F 15/00
(52) U.S. Cl. ........................ 345/350; 345/346; 345/901
(58) Field of Search ................................ 345/157, 169, 345/173, 179, 184, 901, 902, 903, 145, 146, 127, 350, 346; 395/350, 351, 352, 353, 354, 326

(56) References Cited

U.S. PATENT DOCUMENTS

| | | | | |
|---|---|---|---|---|
| 4,159,417 A | * | 6/1979 | Rubincam | 340/815.01 |
| 4,725,694 A | * | 2/1988 | Auer et al. | 340/712 |
| 4,855,725 A | * | 8/1989 | Fernandez | 345/173 |
| 4,862,390 A | * | 8/1989 | Weiner | 395/352 |
| 4,965,558 A | * | 10/1990 | Saki et al. | 345/127 |
| 5,237,651 A | * | 8/1993 | Randall | 345/146 |

FOREIGN PATENT DOCUMENTS

| | | |
|---|---|---|
| EP | 0030160 | 10/1981 |
| EP | 0259024 | 9/1988 |
| FR | 2530047 | 7/1982 |
| WO | WOA8901658 | 2/1989 |

OTHER PUBLICATIONS

Smith, Randall B., "Experiences with the Alternate Reality Kit: An Example of the Tension Between Literalism and Magic," IEEE CG6A, 1987, pp. 42–50.*

* cited by examiner

Primary Examiner—Ba Huynh
(74) Attorney, Agent, or Firm—Fitzpatrick Cella Harper & Scinto

(57) ABSTRACT

An information input/output apparatus processes display of information on a display unit such as an LCD by instructing and operating an input device such as a transparent flat touch panel arranged on the display. The apparatus has a display controller for allowing the display to display a display area pattern for instructing that information which was input from the input device is displayed by the display on a page unit basis. A first pattern to roughly instruct a page, a second pattern to instruct the pages before and after the present page position, and a third pattern to instruct a page by directly inputting a page number are displayed in the display area pattern. The display controller discriminates which one of the first, second, and third patterns is indicated by the instruction operating position of the input device and displays the information of the corresponding page to the display. The document information can be displayed on a display screen on a page unit basis and the operator can freely instruct and display an arbitrary page through the input device.

32 Claims, 4 Drawing Sheets

INFORMATION INPUT/OUTPUT APPARATUS

This application is a continuation of application Ser. No. 08/079,855 filed Jun. 22, 1993, now abandoned, which is a continuation of application Ser. No. 07/668,118 filed Mar. 12, 1991, abandoned.

BACKGROUND OF THE INVENTION

1. Field of the Invention

The present invention relates to an information input/output apparatus having an input apparatus which faces a display screen of a display apparatus and, more particularly, to an information input/output apparatus in which document information can be displayed on the display screen on a page unit basis and an operator can freely designate and display an arbitrary page through the input apparatus.

2. Related Background Art

Hitherto, in a document processing apparatus such as a word processor or the like which can output document information on a page unit basis, there is an apparatus which executes a display of a desired page by operating a special picture plane updating key, a scroll key, or a cursor moving key or an apparatus which directly inputs a page number and can display document information of the page of such a page number.

However, in the above apparatus in which the special picture plane updating key, scroll key, or cursor moving key is operated, a key operation must be performed many times in order to move from a page which is displayed at present to a page which is away therefrom, so that the extremely troublesome operations are necessary.

On the other hand, in a document processing apparatus which directly inputs and displays a page number, in the case where after a page number was largely jumped, the page number is again returned to the original position or the like, the page number must be input many times, so that it is also extremely troublesome.

Although there is also an apparatus which commonly uses the above two operations, those operations are independent and completely different. Therefore, it is difficult to understand the operations, they are complicated, and operating performance deteriorates.

SUMMARY OF THE INVENTION

It is an object of the invention to provide an information input/output apparatus in which there is no need to execute key operations so many times in order to move from a page which is displayed at present to a page which is away therefrom.

It is another object of the invention to provide an information input/output apparatus in which there is no need to input a page number so many times in order to display information of a desired page.

Still another object of the invention is to provide an information input/output apparatus in which troublesome operations are unnecessary in order to display information of a desired page.

Further another object of the invention is to provide an information input/output apparatus in which a plurality of methods can be used in order to display information of a desired page.

DETAILED DESCRIPTION OF THE PREFERRED EMBODIMENTS

An embodiment of the present invention will be described in detail hereinbelow with reference to the drawings.

Figure 1:
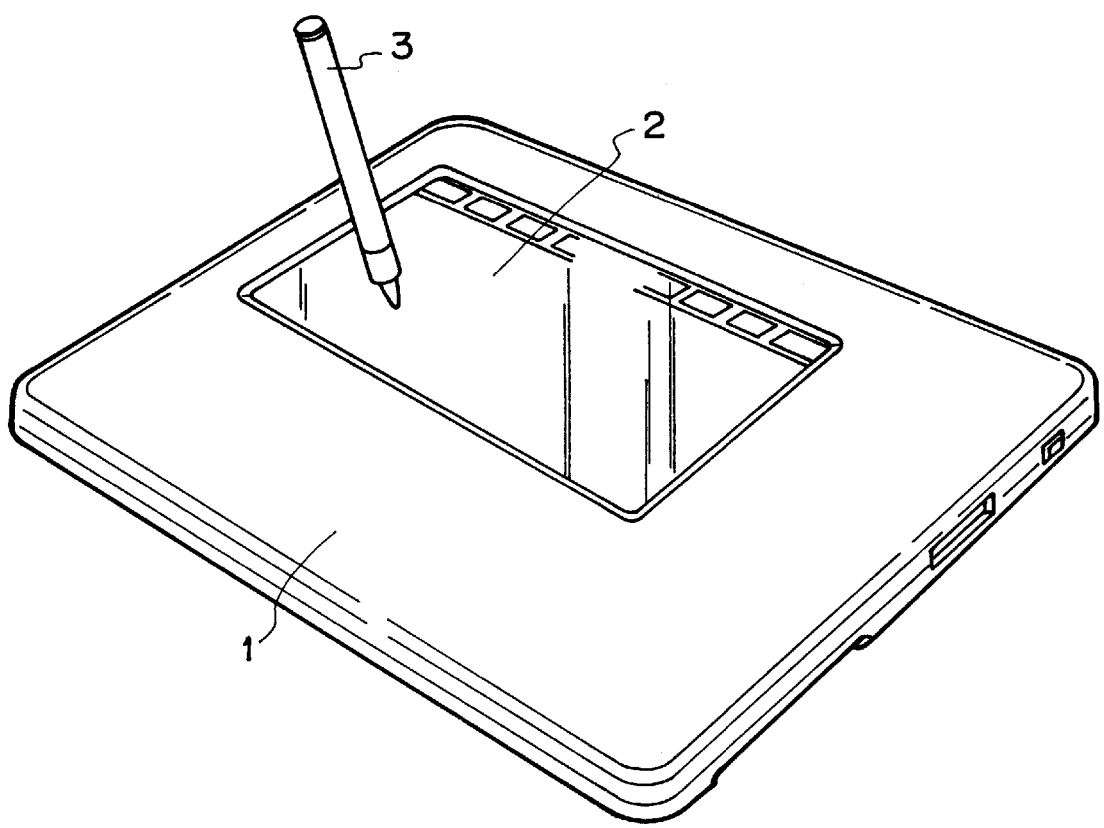
FIG. 1 is an external perspective view of an information input/output apparatus according to an embodiment of the invention.

FIG. 1 is an external perspective view of an information input/output apparatus according to the embodiment of the invention. Reference numeral 1 denotes an information input/output apparatus main body. An input/output section 2 in which a liquid crystal display panel and a digitizer are integratedly formed on an upper surface of the information input/output apparatus. Information can be input to the input/output section 2 by using a pen 3.

Figure 2:
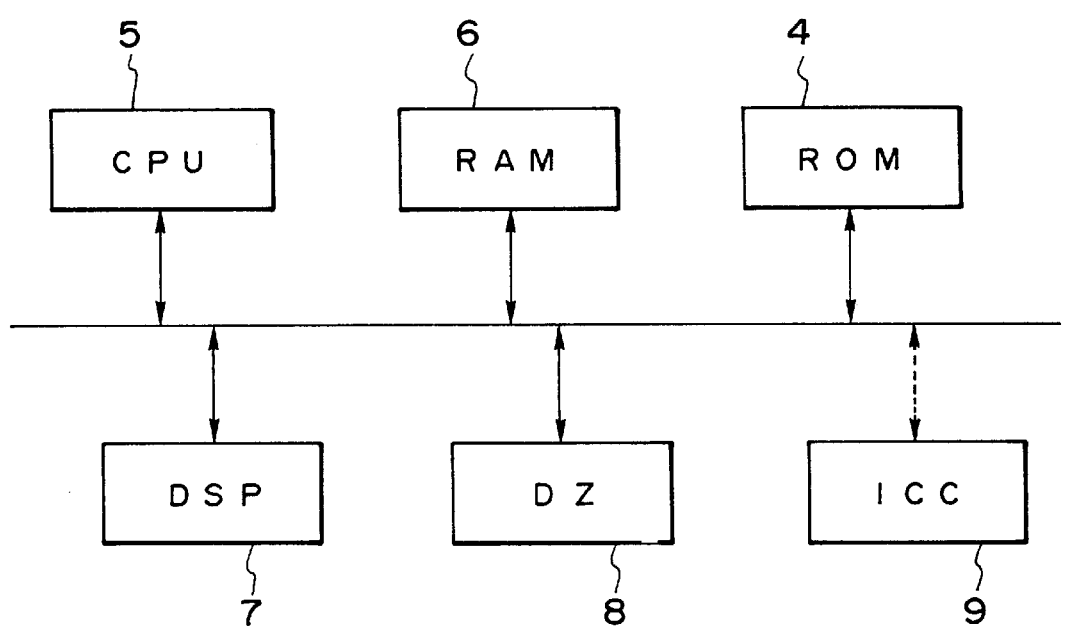
FIG. 2 is a block circuit diagram of the information input/output apparatus according to the embodiment.

FIG. 2 is a block circuit diagram constructing the information input/output apparatus.

Reference numeral 4 indicates an ROM (Read Only Memory). Various control programs including a page jump processing program, which will be described hereinafter, a result of the recognition of a character, a character pattern to be output, and the like have been stored in the ROM 4. A program for character recognition is also obviously included in the above various processing programs.

Reference numeral 5 denotes a CPU (Central Processing Unit) which controls the whole apparatus in accordance with the various control programs stored in the ROM 2.

Reference numeral 6 indicates an RAM (Random Access Memory) which is used as a work area of the CPU 5. The RAM 6 also has an area to store document information which was input from the digitizer, which will be described hereinafter, or the like.

Reference numeral 7 denotes a display comprising a liquid crystal display or the like constructing the input/output section 2. Reference numeral 8 indicates a transparent digitizer (touch panel) of, for example, the resistance film type which similarly constructs the input/output section 2. A figure which was traced on the display 7 is displayed by tracing the upper surface of the digitizer 8 by using the pen 3. On the other hand, when a proper character is traced and input to the digitizer, the character is converted into the regular character pattern and displayed in accordance with the character recognizing program in the ROM 4.

An external memory such as an IC card (ICC) 9 can be also connected.

A practical operation of the page jump processing in the information input/output apparatus constructed as mentioned above will now be described hereinbelow.

Figure 4:
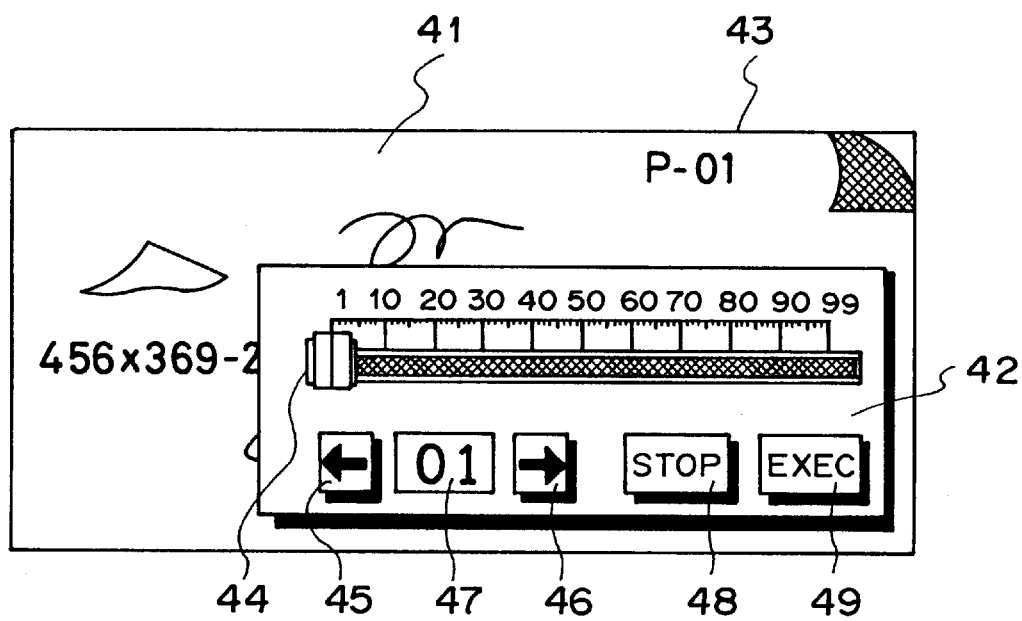
FIG. 4 is a diagram showing a display screen of an input/output section to execute a page jumping operation.

FIG. 4 is a diagram showing a display screen of the input/output section 2 to execute the page jumping operation. Reference numeral 41 denotes a display screen which displays a present page and 42 indicates a window area for a page operation. The window area is called a page operation area hereinbelow. Reference numeral 43 denotes a present page number indication and 44 indicates a page designation knob indication to roughly designate a page. According to the embodiment, an arbitrary page among pages 1 to 99 can be roughly designated by designating the page designation knob indication 44 and moving it to the right or left with a pen or the like.

Reference numerals 45 and 46 denote button indications to shift the display content from the present page to the page before or after the present page. When the button indication 45 is designated the display content is shifted to the page having the page number which is smaller than the number of the present page by one. When the button indication 46 is instructed, the display content is shifted to the page having the page number which is larger than the number of the present page by one. Reference numeral 47 denotes a display window which displays the instructed page number. A page can be also directly designated by rewriting the number in the display window 47 by using the pen. On the other hand, the display window 47 displays the designation result even by the designation operation of the page designation knob indication 44 or the button indication 45 or 46. Reference numeral 48 denotes a stop instructing button indication. The page operation area 42 can be closed by instructing the stop instructing knob indication 48 without moving the page. Reference numeral 49 indicates an execution button indication to execute the jumping operation to the page displayed in the display window 47 as a result of the designation operation of the page designation knob indication 44 or the button indication 45 or 46.

Figure 3:
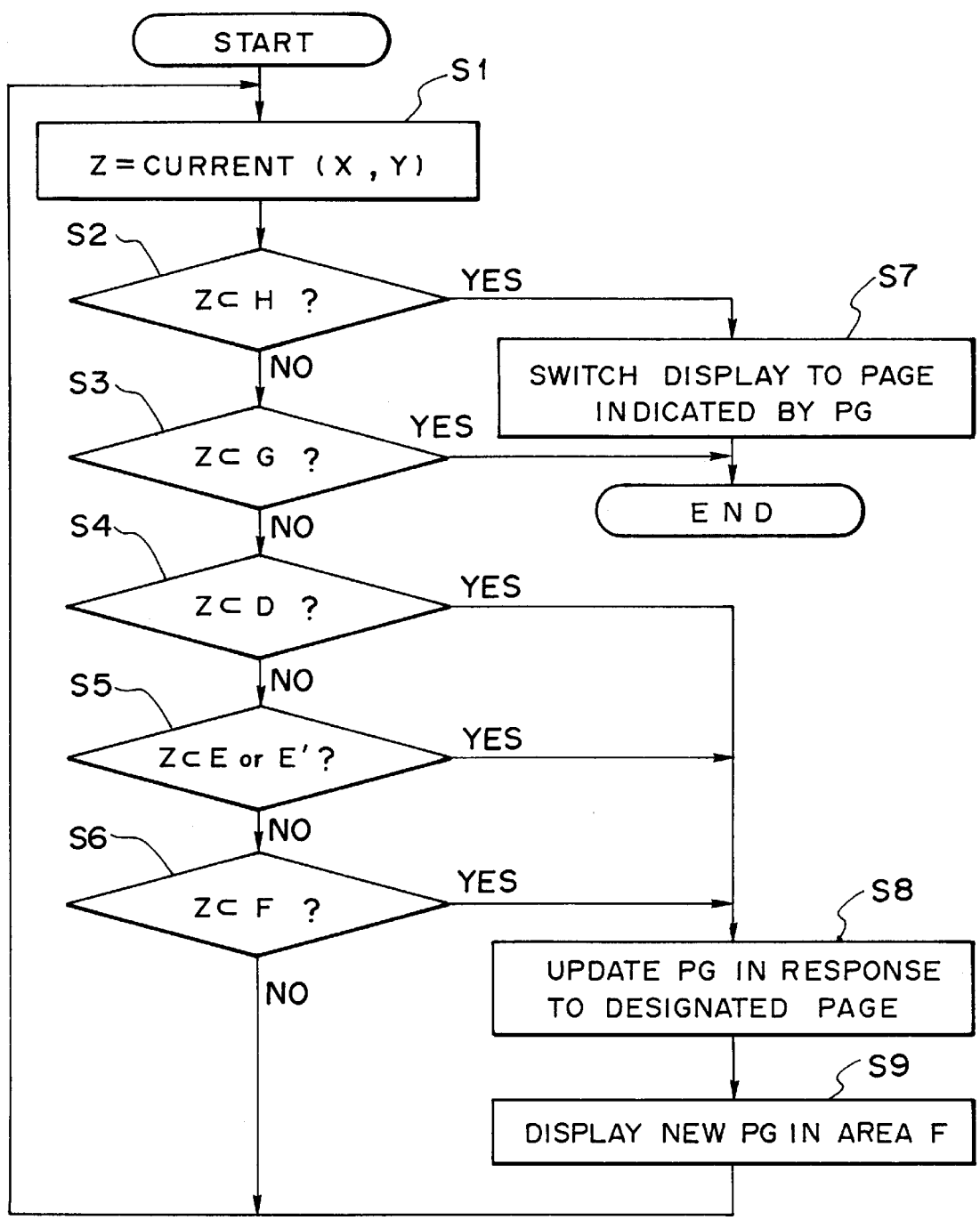
FIG. 3 is a flowchart showing a page jump processing program.

FIG. 3 is a flowchart showing a page jump processing program which is activated when the page operation area 42 is traced by the pen.

In step S1, coordinates (X, Y) which are pressed by the pen at present are first substituted for a variable Z. It is now assumed that the coordinates of the left upper corner on the display screen are set to the origin and the coordinates of the right lower corner are set to (319, 127), and the coordinates (X, Y) of the pen are controlled so as to be updated every 16 msec.

In the next step S2, the values which were substituted for the coordinate variable Z mentioned above are compared to an area H which is shown by a left upper coordinate $H_L$ and a right lower coordinate $H_R$ of the execution button indication 49 shown in FIG. 4, thereby discriminating whether the coordinate Z exists in the area H or not.

If the coordinate Z exists in the area H, step S7 follows and the page jumping operation is executed, the page number displayed in the display window 47 is set to a display page PG, and an object to be edited is switched to data of the page number PG.

If the coordinate Z doesn't exist in the area H, the processing routine advances to step S3. In step S3, a check is made to see if the coordinate Z exists in an area G shown by the stop button indication (48 in FIG. 4) to instruct the stop of the page jumping operation or not. If the coordinate Z exists in the area G, nothing is executed and the processing routine is finished.

If the coordinate Z doesn't exist in the stop button indication area G, the processing routine advances to step S4.

Similar processes are executed in steps S4 to S6 hereinbelow.

In step S4, a check is made to see if the coordinate Z exists in an area D shown by the page designation knob indication 44 to roughly designate a page or not. In step S5, a check is made to see if the coordinate Z exists in areas E and E' of the button indications 45 and 46 or not. In step S6, a check is made to see if the coordinate Z exists in an area F of the display window 47 or not. If the coordinate Z doesn't exist all of the above display areas, the processing routine is returned to step S1 and the above processes are repeatedly performed.

If it is determined that the coordinate Z exists in each of the above display areas, step S8 follows. In step S8, the apparatus waits until the pen is pulled up and the page number PG displayed in the display window 47 is updated in accordance with the page designation method corresponding to each of the areas. Then, step S9 follows and the updated page number PG is again displayed in the display window 47.

After that, the processing routine is returned to step S1 and the above processes are repeated.

By the above operations, a combination of a plurality of kinds of pages can be designated in one page operation area and each of the designation displays mutually interlockingly changes, so that an operating performance of the page designation by the operator is extremely improved.

[Another Embodiment]

Figure 5:
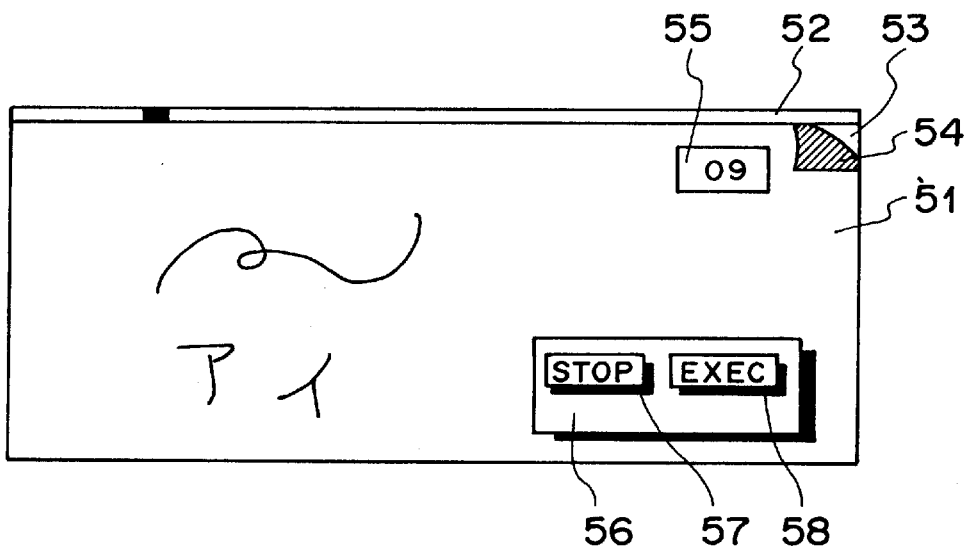
FIG. 5 is a diagram showing the display screen of the input/output section to execute the page jumping operation according to another embodiment.

FIG. 5 is a diagram showing the display screen of the input/output section 2 to execute the page jumping operation according to another embodiment and shows an example in which a display layout of the input/output section 2 was changed. Since a block circuit diagram of an information processing apparatus main body is substantially the same as that in FIG. 2, its explanation is omitted.

In FIG. 5, reference numeral 51 denotes an input display screen of the present page and 52 indicates an operation bar indication to roughly designate a page. A left edge of the operation bar indication 52 is set to 1 and a right edge is set to 99. A black portion is commonly used as a present page display and a designation knob.

Reference numerals 53 and 54 indicate designate display areas to shift a display content to the page before or after the present page and show areas which are displayed in a state in which the page was turned over.

Reference numeral 55 denotes an area in which the present page or the designated page is displayed and a desired page number is directly input by using a character recognition.

Reference numeral 56 indicates a window indication which is displayed when the page designation operations 51 to 55 are executed. A stop instructing button indication 57 and an execution button indication 58 which perform functions similar to those in the above embodiment are provided in the window indication 56.

As in the above embodiment, according to a display layout of the input/output section 2 in the embodiment, a large area of the edition area in the input display screen is not occupied by the page operation area and a space is not used in vain.

As described above, according to the information input/output apparatus of the invention, a combination of a plurality of kinds of pages can be designated in one page operation area displayed on the display screen and each of the designation displays is mutually interlockingly changed, so that there is an effect such that an operating performance of the page designation by the operator is extremely improved.

What is claimed is:

1. An information processing apparatus for displaying information to a display means by instructing and operating input means arranged on the display means, comprising:

memory means for storing data which can be displayed by the display means on a page unit basis;

first indicating means for indicating a page currently displayed using a movable operation bar and for roughly designating another page by changing a position of the operation bar;

second indicating means for indicating a page currently displayed by displaying a page number and for finely designating said another page by changing the displayed page number;

changing means for changing the displayed page number to said another page number in response to actuation of any of said first and second indicating means;

detecting means for detecting a page jumping instruction; and control means for controlling the memory means and the display means such that data for the page corresponding to said another page number displayed when said instruction is detected is read from said memory means and displayed by the display means in response to the detection of the page jumping instruction by said detecting means.

2. An apparatus according to claim 1, wherein the input means comprises a transparent flat touch panel.

3. An apparatus according to claim 1, wherein the display means is a liquid crystal display.

4. An information processing method for displaying information by instructing and operating an input unit on a display, said method using a memory for storing data which can be displayed by display on a page unit basis, comprising the steps of:

finely designating another page by rewriting a page number displayed in a display window on a display area of the display from a number indicating a page currently displayed to another page number by using a pen;

changing a position of an operation bar in response to said finely designating step;

detecting a page jumping instruction; and controlling the display such that data for the page stored in the memory, the page corresponding to said another page number displayed when said instruction is detected, is displayed by the display in response to the detection of the page jumping instruction in said detecting step.

5. The information processing method according to claim 4 further comprising mutually changing the display of the movable operation bar and the page number.

6. The information processing method according to claim 4, wherein the input unit is a transparent flat touch screen.

7. The information processing method according to claim 4, wherein the display is a liquid crystal display.

8. An apparatus according to claim 1, wherein said first indicating means comprises a knob.

9. An apparatus according to claim 1, wherein said first indicating means designates pages before and after a present page.

10. An apparatus according to claim 1, wherein the input means comprises a digitizer.

11. An apparatus according to claim 1, wherein the data displayed by the display means is input by the input means.

12. An apparatus according to claim 1, wherein the data displayed by the display means is text data obtained by recognizing data input by the input means.

13. A method according to claim 4, wherein said operation bar includes a knob.

14. A method according to claim 4, wherein said roughly designating a page includes indicating pages before and after a present page.

15. A method according to claim 4, wherein the input unit comprises a digitizer.

16. An method according to claim 4, wherein the data displayed by the display is input by the input unit.

17. A method according to claim 4, wherein the data displayed by the display is text data obtained by recognizing data input by the input unit.

18. An apparatus according to claim 1 further comprising:

determining means for determining a page number by evaluating the designation made by said first indicating means;

display control means for controlling the display means to display the page number determined by said determining means; and instruction means for instructing update of data displayed by the display means, wherein said control means controls said memory means and the display means in response to an instruction given by said instruction means.

19. A method according to claim 4, further comprising the steps of:

determining a page number by evaluating the designation made in the finely designating step;

controlling the display to display the page number determined in said determining step; and instructing update of data displayed by the display, wherein said control step controls the memory and the display in response to an instruction given in said instruction step.

20. A computer usable medium having stored computer readable instruction codes for an information processor displaying information by instructing and operating an input unit on a display using a memory for storing data which can be displayed on a page unit basis, comprising:

a first set of computer readable instruction codes for finely designating another page by rewriting a page number displayed on a display area of the display from a number indicating a page currently displayed in a display window to another page number by using a pen;

a second set of computer readable instruction codes for changing a position of an operation bar in response to said finely designating step changing the page number;

a third set of computer readable instruction codes for detecting a page jumping instruction; and a fourth set of computer readable instruction codes for controlling the display such that data for the page stored in the memory, the page corresponding to said another page number displayed when said instruction is detected, is displayed by the display in response to the detection of the page jumping instruction in said detecting step.

21. A computer usable medium according to claim 20 further comprising a fifth set of computer readable instruction codes for mutually changing the display of the movable operation bar and the page number.

22. A computer usable medium according to claim 20, wherein the input unit is a transparent flat touch screen.

23. A computer usable medium according to claim 20, wherein the display is a liquid crystal display.

24. A computer usable medium according to claim 20, wherein said operation bar includes a knob.

25. A computer usable medium according to claim 20, wherein said first set of computer readable instruction codes includes a set of computer readable instruction codes for indicating pages before and after a present page.

26. A computer usable medium according to claim 20, wherein the input unit comprises a digitizer.

27. A computer usable medium according to claim 20, wherein the data displayed by the display is input by the input unit.

28. A computer usable medium according to claim 20, wherein the data displayed by the display is text data obtained by recognizing data input by the input unit.

29. A computer usable medium according to claim 20, further comprising:
- a fifth set of computer readable instruction codes for determining a page number by evaluating the designations made by the first and second sets of computer readable instruction codes;
- a sixth set of computer readable instruction codes for controlling the display to display the page number determined by the fifth set of computer readable instruction codes; and
- a seventh set of computer readable instruction codes for instructing update of data displayed by the display, wherein said sixth set of computer readable instruction codes controls the memory and the display in response to an instruction given by said seventh set of computer readable instruction codes.

30. An information processing apparatus according to claim 1, further comprising first indicating means for indicating a page currently displayed using a movable operation bar and for roughly designating another page by changing a position of the operation bar.

31. An information processing method according to claim 4, further comprising the step of roughly designating another page by changing a position of a movable operation bar from a position which indicates a page currently displayed.

32. A computer usable medium according to claim 20, comprising a first set of computer readable instruction codes for roughly designating another page by changing a position of a movable operation bar from a position which indicates a page currently displayed.

* * * * *

UNITED STATES PATENT AND TRADEMARK OFFICE
CERTIFICATE OF CORRECTION

PATENT NO. : 6,377,254 B1  
DATED : April 23, 2002  
INVENTOR(S) : Katsuhiko Sakaguchi It is certified that error appears in the above-identified patent and that said Letters Patent is hereby corrected as shown below:

<u>Title page,</u>
Item [*] Notice, insert -- This patent issued on a continued prosecution application filed under 37 CFR 1.53(d), and is subject to the twenty year patent term provisions of 35 U.S.C. 154(a)(2). --.
Item [56], OTHER PUBLICATIONS, "CG6A" should read -- CG&A --.

<u>Column 2,</u>
Line 20, "An" should read -- In an --.
Line 21, "in which" should be deleted.

<u>Column 4,</u>
Line 1, "all" should read -- in all --.
Line 67, "using a movable operation bar and for" should read -- by displaying a page number in a display window and for finely designating another page by rewriting a page number in the display window by using a pen; --.

<u>Column 5,</u>
Lines 1-6, should be deleted.
Line 8, "said" should be deleted.
Line 9, "and second" should be deleted.

<u>Column 6,</u>
Line 1, "An" should read -- A --.
Line 6, "claim 1" should read -- claim 1, --.

<u>Column 8,</u>
Line 6, "first" should read -- second --.

Signed and Sealed this

Twenty-ninth Day of July, 2003

JAMES E. ROGAN
*Director of the United States Patent and Trademark Office*